United States Patent [19]
Van Sickle

[11] Patent Number: 5,967,608
[45] Date of Patent: Oct. 19, 1999

[54] PNEUMATIC LUMBAR ADJUSTMENT SYSTEM

[75] Inventor: James R. Van Sickle, New Baltimore, Mich.

[73] Assignee: Bytec Incorporated, Clinton Township, Mich.

[21] Appl. No.: 09/073,536

[22] Filed: May 6, 1998

[51] Int. Cl.⁶ ....................................................... A47C 4/54
[52] U.S. Cl. ..................................... 297/284.6; 297/284.4
[58] Field of Search ........................... 297/DIG. 3, 284.1, 297/284.4, 284.6, 452.41, 284.8; 137/223

[56] References Cited

U.S. PATENT DOCUMENTS

| | | |
|---|---|---|
| 4,792,186 | 12/1988 | Benjamin et al. . |
| 4,915,124 | 4/1990 | Sember, III . |
| 5,076,643 | 12/1991 | Colasanti et al. . |
| 5,135,282 | 8/1992 | Pappers . |
| 5,152,579 | 10/1992 | Bishai . |
| 5,190,348 | 3/1993 | Colasanti . |
| 5,634,685 | 6/1997 | Herring . |
| 5,711,575 | 1/1998 | Hand et al. . |
| 5,713,631 | 2/1998 | O'Neill et al. . |
| 5,758,925 | 6/1998 | Schrewe et al. . |
| 5,860,699 | 1/1999 | Weeks . |

*Primary Examiner*—Milton Nelson, Jr.
*Attorney, Agent, or Firm*—Baker & Daniels

[57] ABSTRACT

A pneumatic lumbar adjustment system for a vehicle seat includes an inflatable bladder, a pump and a solenoid valve, all of which are mounted on a backing plate which is secured to the back frame of the seat in the lumbar region. The pump and solenoid valve are connected to the vehicle electrical system through a three way switch accessible to the seat occupant through a two terminal lead. One switch position is the "off" position in which power to both the pump and the solenoid valve are turned off, and the other two positions are actuated positions, but in which one actuated position reverses the polarity of the terminals. In one of the actuated positions, power is supplied to the pump and the solenoid, causing the bladder to inflate. In the other actuated position in which the polarity of the terminals are reversed, power is supplied only to the solenoid valve and not to the pump, causing the solenoid valve to exhaust air from the bladder. Since inflation and deflation of the bladder may be stopped at any time by the occupant merely moving the switch to the off position, the desired amount of lumbar support may be selected.

15 Claims, 6 Drawing Sheets

PNEUMATIC LUMBAR ADJUSTMENT SYSTEM

This invention relates to a pneumatic lumbar adjustment system for vehicle seating.

Modern vehicles are commonly equipped with luxurious seating that is both attractive and functional in that it supports the occupant's body to reduce fatigue during long drives. This type of seating is commonly equipped with a lumbar adjustment device which can be used by the seat occupant to increase and decrease the support provided in the lumbar region of the occupant's back. These devices are commonly equipped with a control that enables the occupant to control the amount of lumbar support. Lumbar adjustment may be provided by a pneumatic system in which a small pump supplies compressed air to a bladder mounted within the lumbar region of the seat back. By inflating and deflating the bladder, the seat occupant can adjust the degree of support provided to the lumbar region of the occupant's back.

The present invention provides a bladder which is mounted on a backing plate which can be easily secured to the frame of the seat back. A pump and solenoid valve are also mounted on the backing plate, so that the entire pneumatic lumbar adjustment system can be installed as a unit when the seat is manufactured. The electrical connection to the pump and solenoid valve is a conventional two wire electrical terminal arrangement. A three position switch mounted in an area of the seat that is readily accessible to the vehicle operator is moved to a position in which the polarity of the terminals cause the pump to inflate the bladder and to another opposite position that reverses the polarity of the terminals and causes the bladder to be deflated. When moved into the third position, in which no power is supplied to the terminals, air is trapped in the bladder to provide the degree of lumbar support desired by the seat occupant. Accordingly, the pneumatic lumbar adjustment system can already be installed as a package when the seat is manufactured, but only a single, two terminal conventional connection is required.

These and other advantages of the present invention will become apparent from the following description, with reference to the accompanying drawings, in which.

Figure 1:
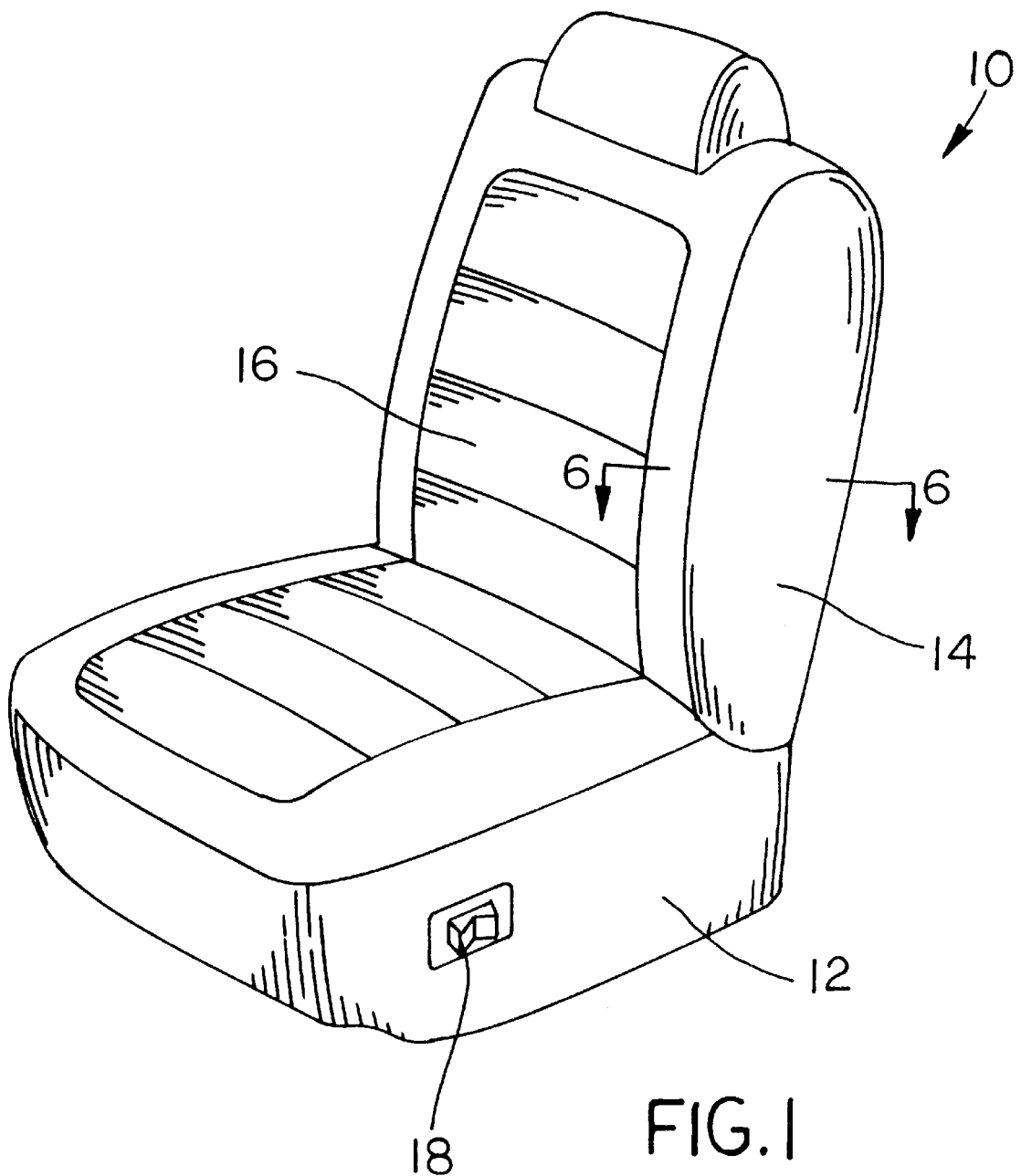
FIG. 1 is a perspective view of a vehicle seat including a pneumatic lumbar adjustment system made pursuant to the teachings of the present invention.

Referring now to the drawings, vehicle seating generally indicated by the numeral 10 includes a bottom portion 12 from which a back portion 14 extends. In order to reduce driver fatigue, it is desirable to be able to adjust the lumbar portion generally indicated by the numeral 16 of the seat to provide a greater or lesser support in the lumbar region of the back of the occupant of the seat 10. This is commonly done by providing an inflatable bladder behind the padding of the lumbar region 16 of the seat 10 which, when inflated, bulges slightly toward the seat occupant. A three position switch 18 is mounted in a convenient location where it can be used by the seat occupant to control inflation and deflation of the bladder controlling the lumbar region of the seat 16.

Figure 2:
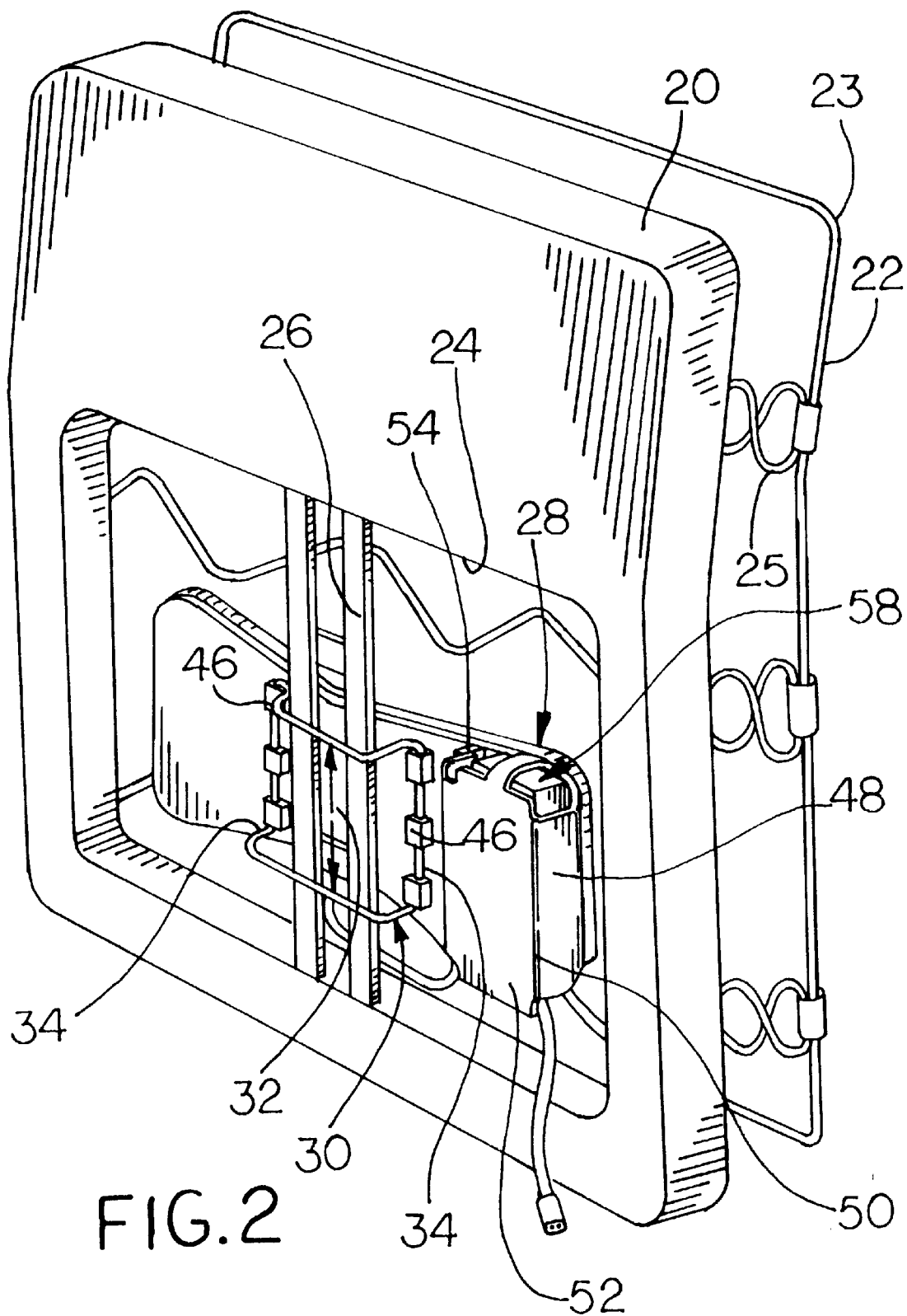
FIG. 2 is a view, taken from the rear, of a back seat frame used in the seat illustrated in FIG. 1, the frame being shown with all padding and upholstery removed.
Figure 3:
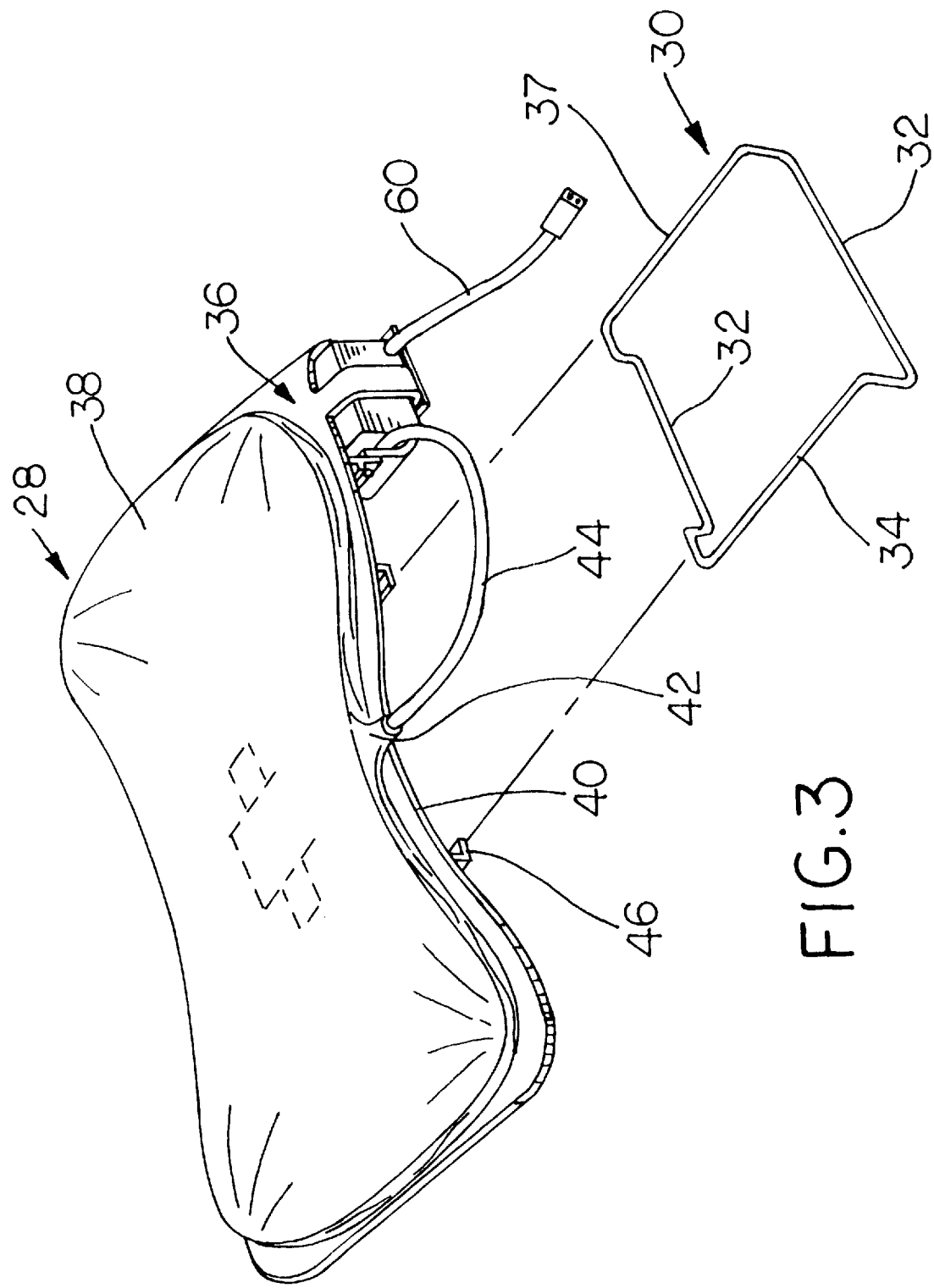
FIG. 3 is a view in perspective of the pneumatic lumbar adjustment system made pursuant to the teachings of the present invention and the mounting bracket used to secure the adjustment system to the frame illustrated in FIG. 2.

Referring now to FIG. 2, the seat back 14 is supported on a frame 20 which carries a spring member 22 that supports cushioning and upholstery used to define the contour of the seat back 14 which supports the occupant's back. The springed member 22 includes a wire frame 23 which is urged away from the frame 20 by springs 25. An aperture 24 is formed in the frame 20 and a vertically oriented center support 26 is secured to the frame 20 and extends through the aperture 24. A pneumatic lumbar adjustment system generally indicated by the numeral 28, and which is made pursuant the teachings of the present invention, is attached to the center support 26 via a formed wire bracket generally indicated by the numeral 30. The bracket 30 includes transverse members 32, each of which are welded to the center support 26 and a pair of arms 34 which project forwardly from the transverse member 32 toward the springed member 22.

The lumbar adjustment system 28 of the present invention includes a molded back plate 36 which is made of a semi-rigid material. One side of an inflated bladder generally indicated by the numeral 38 is secured to the flat portion 40 of the backing plate 36. The bladder 38 is preferably made of a polyurethane sheet material, and is provided with a nipple 42 which is connected with a hose 44 for inflation and deflation of the bladder 38. Hooks 46 extends from the side of portion 40 opposite that upon which the bladder 38 is attached and extend around arms 34 of the bracket 30 when the lumbar adjustment system 28 is installed on the frame 20. The backing plate 36 is semi-rigid, and can be flexed slightly to permit the hooks 46 to engage over the arms 34. Backing plate 36 includes a curved portion 48 that extends outwardly from portion 40 of vacuum plate 28. A so called "living hinge" 50 (which is a groove molded into the material from which the vacuum plate is made when the vacuum plate is molded) connects portion 48 with folded over portion 52. The living hinge 50 permits the folded over portion 52 to bend relative to the outwardly extending portion 48. Folded over portion 52 terminates in an inwardly extending portion 54, which engages a fastener 45 which projects from portion 40 of the backing plate. Accordingly, the portions 48, 52 and 54 cooperate with the portion 40 of the backing plate to define a pocket receiving a conventional pump and solenoid assembly indicated by the numeral 58. The pump and solenoid assembly may be wrapped in a sheet of foam insulation to cushion the latter when installed in the aforementioned pocket formed on the backing plate 36. The pump and solenoid assembly is connected to the switch 18 and therefore to the electrical system of the vehicle by a two terminal lead 60.

Figure 5:
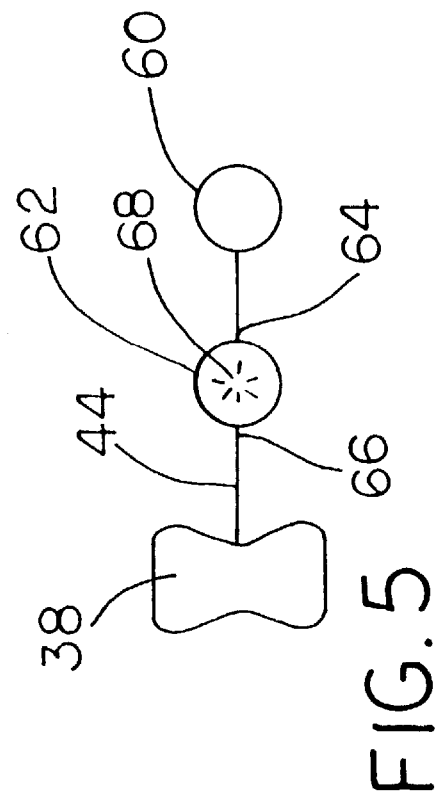
FIG. 5 is a schematic illustration of the pneumatic circuit of the integrated pneumatic lumbar adjustment system illustrated in FIG. 3.

Referring to FIG. 5, the pump is indicated schematically at 60 and the solenoid valve is indicated schematically at 62. The outlet of the pump 60 is connected to the inlet 64 as the solenoid valve 62, and the hose 44 connects the outlet 66 of the solenoid valve 62 with the bladder 38. The pump 60 is a conventional pump and pumps ambient air to the bladder 38 through the solenoid valve 62. The valve 62 further includes an exhaust 68 which can exhaust to atmosphere. The valve 62 is a conventional two position, normally closed solenoid valve which in the absence of an electrical signal closes off the exhaust port 68 and inlet port 64 from the outlet port 66, thereby trapping pressure in the bladder 38. When the solenoid valve 62 is energized, the exhaust port 68 and inlet port 64 are opened to the outlet port 66, but since flow through the exhaust port 68 is restricted, the output of the pump 60 can inflate the bladder 38.

Figure 4:
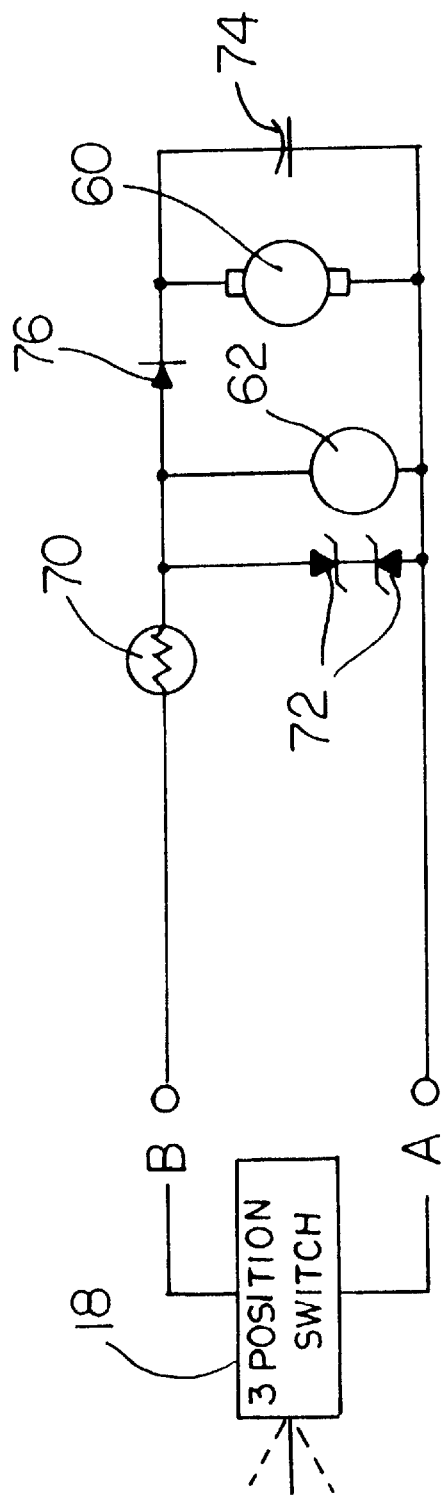
FIG. 4 is a schematic illustration of the electrical system used to control the pneumatic lumbar adjustment system illustrated in FIG. 3.

Referring now to FIG. 4, the three position switch 18 is connected across the terminals A and B, and can be moved from the "off" position illustrated in FIG. 4 to either of two actuated positions illustrated by the dashed lines. One actuated position reverses the polarity of the terminals A and B from the polarity of the other actuated position. A PTC thermistor 70 acts as a pump motor/solenoid valve overload protector, and opens the circuit if excessive current is sensed. Zener diodes 72 prevent excessive transient voltages from being sent back into the vehicle wiring harness. The capacitor 74 filters out motor noise. A diode 76 is connected between the solenoid valve 62 and the pump 60 so that when the B terminal is positive, current flows through both the solenoid valve 62 and the pump 60, but when the polarity is reversed, current flows through the solenoid valve 62 but not through the pump 60.

Figure 6:
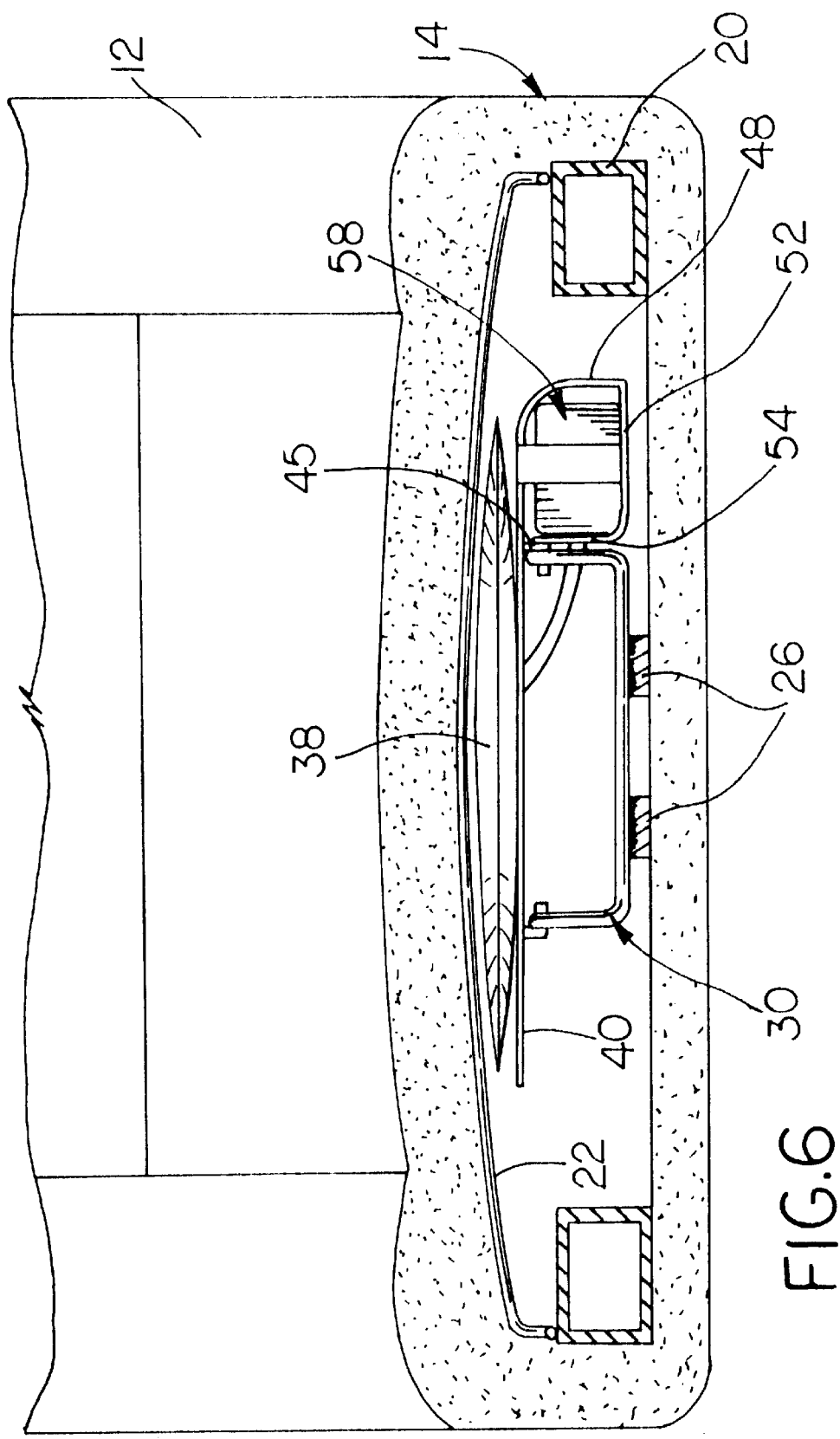
FIG. 6 is a view taken substantially along lines 6—6 of FIG. 1, illustrating the pneumatic lumbar adjustment system of the present invention in its deflated condition.
Figure 7:
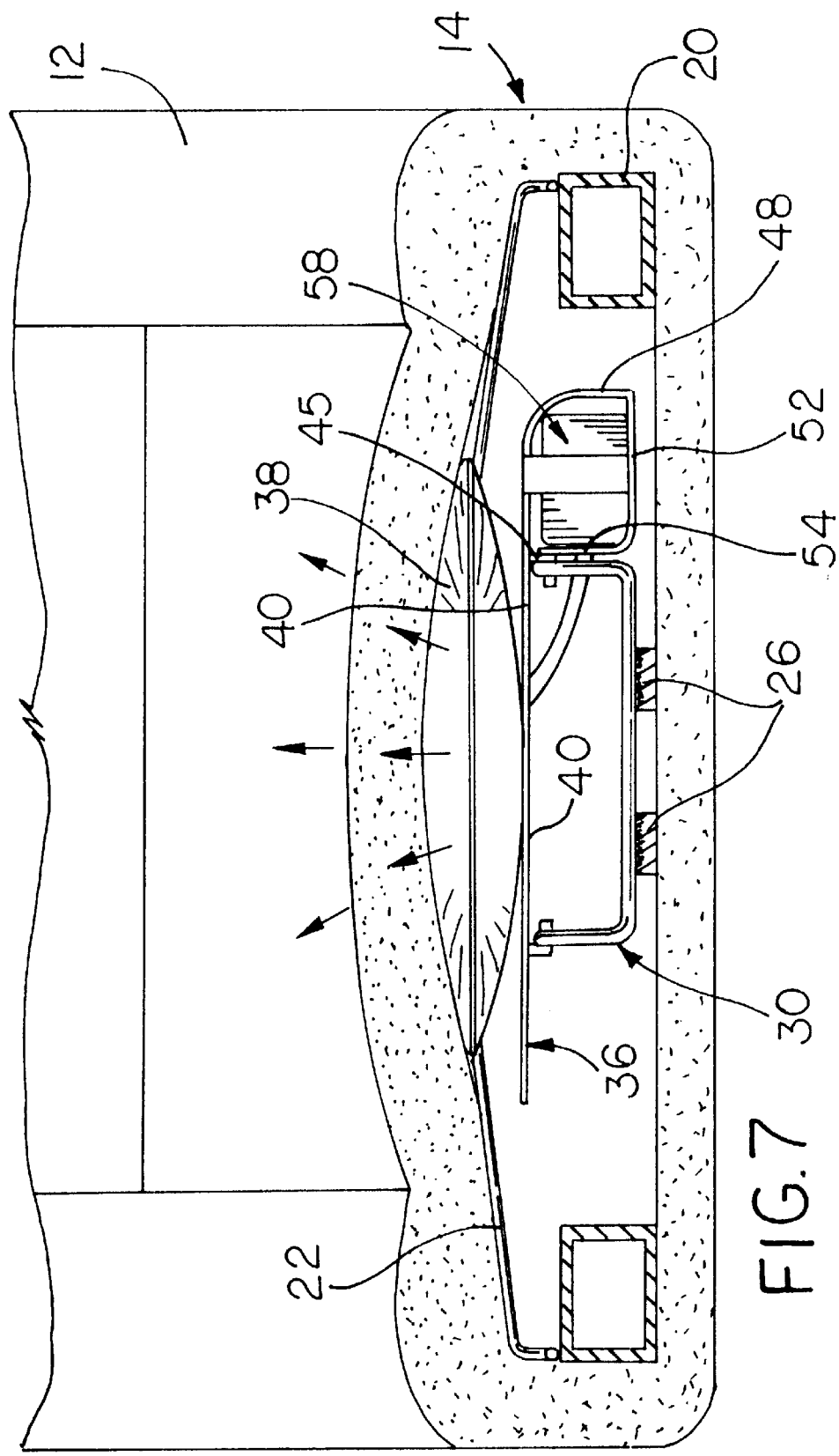
FIG. 7 is a view similar to FIG. 6, but illustrating the integrated pneumatic lumbar adjustment system of the present invention in its inflated condition.

In operation, and referring to FIGS. 6 and 7, when the occupant of the seat 10 wishes to increase the support provided by the seat back in the lumbar region, the operator moves the switch 18 to the position in which the polarity of the B terminal is positive. This causes the solenoid valve 16 to open, thereby connecting the inlet 64 with the outlet 66, and turns on the pump 60. Accordingly, the outlet of the pump 60 inflates the bladder 38, so that the contour of the lumbar region of the seat back 14 is changed from that illustrated in FIG. 6 to that illustrated in FIG. 7. At any time during inflation of the bladder 38, the occupant can move the three position switch 18 back to the solid position in FIG. 4, whereby turning power off to both the pump 60 and the solenoid valve 62. The solenoid valve 62 then returns to its normally closed position, shutting off the exhaust port 68, and thereby trapping air in the bladder 38 so that the bladder 38 remains in a distended position to the extent desired by the seat occupant to provide the degree of lumbar support desired. When the occupant of the seat 10 desires to reduce the degree of lumbar support provided by the bladder 38, the seat occupant moves the switch 18 to the other actuated position, thereby reversing the polarity of the terminals A and B and causing the A terminal to become positive. When this occurs, the solenoid valve 62 opens, but current is kept from flowing through the pump 60 by the diode 76. Accordingly, the pump does not turn on, so that the solenoid valve 62 exhausts the air trapped in the bladder 38 through exhaust port 68. The bladder therefore deflates into the FIG. 6 position. At any time during deflation of the bladder 38, the seat occupant may move the switch 18 to the off position, thereby turning off the solenoid valve 62 and trapping the remaining air in the bladder 38. Accordingly, the amount of lumbar support may be precisely controlled both during inflation and deflation of the bladder 38 by the vehicle operator manipulating the switch 18.

What is claimed:

1. Pneumatic lumbar adjustment system for a seat having a back having a lumbar region and a frame supporting said back comprising an inflatable bladder, means for mounting said bladder on said frame in the lumbar region of the back, an electric pump for inflating the bladder with air, an electrically operated valve for controlling exhaust from said bladder, and an actuating mechanism operable from a first condition causing said pump to inflate the bladder to a second condition stopping said pump and causing said valve to trap air in the bladder to a third condition opening said valve without actuating the pump to exhaust air from the bladder.

2. Pneumatic lumbar adjustment system as claimed in claim 1, wherein said pump has an outlet and said electrically operated valve includes an inlet communicated to the outlet of the pump, an outlet communicated to the bladder, and an exhaust communicating with ambient atmosphere.

3. Pneumatic lumbar adjustment system as claimed in claim 2, wherein said valve is switchable between a first state in which the outlet is disconnected from the exhaust and a second state in which the outlet is connected to the inlet and the exhaust, said actuating mechanism switching said valve into said second state when said actuating means is in the first or third conditions and into said first state when the actuating means is in the second condition.

4. Pneumatic lumbar adjustment system as claimed in claim 3, wherein electrical energy is transmitted to said pump and said valve through a pair of terminals having positive and negative polarity when electrical energy is transmitted to said pump and valve, said terminals being connected to said actuating mechanism, said actuating mechanism supplying electrical energy at a predetermined polarity to said terminals when the actuating mechanism is in the first condition, switching off power to said terminals when in said second condition, and supplying electrical energy in said third condition to said terminals at a polarity opposite to the polarity of the predetermined polarity.

5. Pneumatic lumbar adjustment system as claimed in claim 4, wherein electrical energy is transmitted between said valve and said pump through a one way electrical conductor, whereby electrical energy is transmitted to said pump to operate the latter when electrical energy is supplied to said terminals at said predetermined polarity but is interrupted to said pump by said one way electrical conductor when electrical energy is supplied to said terminals at said opposite polarity.

6. Pneumatic lumbar adjustment system as claimed in claim 1, wherein electrical energy is transmitted to said pump and said valve through a pair of terminals having positive and negative polarity when electrical energy is transmitted to said pump and valve, said terminals being connected to said actuating mechanism, said actuating mechanism supplying electrical energy at a predetermined polarity to said terminals when the actuating mechanism is in the first condition, switching off power to said terminals when in said second condition, and supplying electrical energy in said third condition to said terminals at a polarity opposite to the polarity of the predetermined polarity.

7. Pneumatic lumbar adjustment system as claimed in claim 6, wherein electrical energy is transmitted between said valve and said pump through a one way electrical conductor, whereby electrical energy is transmitted to said pump to operate the latter when electrical energy is supplied to said terminals at said predetermined polarity but is interrupted to said pump by said one way electrical conductor when electrical energy is supplied to said terminals at said opposite polarity.

8. Pneumatic lumbar adjustment system as claimed in claim 7, wherein said bladder is mounted on a backing plate, said pump and said valve being mounted on said backing plate.

9. Pneumatic lumbar adjustment system as claimed in claim 8, wherein said backing plate includes a folded over portion defining a pocket, said pump and said valve being received within said pocket whereby said bladder, said valve, and said pump are carried by the backing plate.

10. Pneumatic lumbar adjustment system as claimed in claim 1, wherein said bladder is mounted on a backing plate, said pump and said valve being mounted on said backing plate.

11. Pneumatic lumbar adjustment system as claimed in claim 10, wherein said backing plate includes a folded over portion defining a pocket, said pump and said valve being received within said pocket whereby said bladder, said valve, and said pump are carried by the backing plate.

12. Pneumatic lumbar adjustment system for a seat having a back, said back having a lumbar region and a frame supporting said back, comprising an inflatable bladder, means for mounting said bladder on said frame in the lumbar region of the back, an electric pump for inflating the bladder with air, an electrically operated valve for controlling exhaust from said bladder, said bladder is mounted on a backing plate, and means for securing said backing plate to said frame, said pump and said valve being mounted on said backing plate.

13. Pneumatic lumbar adjustment system as claimed in claim 12, wherein said backing plate includes a folded over portion defining a pocket, said pump and said valve being received within said pocket whereby said bladder, said valve, and said pump are carried by the backing plate.

14. Pneumatic lumbar adjustment system as claimed in claim 12, wherein electrical energy is transmitted to said pump and said valve through a pair of terminals having positive and negative polarity when electrical energy is transmitted to said pump and valve, said terminals being connected to a three position switch, said switch supplying electrical energy at a predetermined polarity to said terminals when the switch is in a first position, said switch switching off power to said terminals when in a second position, said switch when moved to a third position supplying electrical energy to said terminals at a polarity opposite to the polarity of the predetermined polarity.

15. Pneumatic lumbar adjustment system as claimed in claim 14, wherein electrical energy is transmitted between said valve and said pump through a one way electrical conductor, whereby electrical energy is transmitted to said pump to operate the latter when electrical energy is supplied to said terminals at said predetermined polarity but is interrupted to said pump by said one way electrical conductor when electrical energy is supplied to said terminals at said opposite polarity.

\* \* \* \* \*